United States Patent
Kakuya et al.

(10) Patent No.: US 11,873,230 B2
(45) Date of Patent: Jan. 16, 2024

(54) HYDROTALCITE PARTICLES, METHOD FOR PRODUCING HYDROTALCITE PARTICLES, RESIN STABILIZER CONTAINING HYDROTALCITE PARTICLES, AND RESIN COMPOSITION CONTAINING HYDROTALCITE PARTICLES

(71) Applicants: TODA KOGYO CORP., Hiroshima (JP); SAKAI CHEMICAL INDUSTRY CO., LTD., Sakai (JP)

(72) Inventors: Koji Kakuya, Sanyoonoda (JP); Atsuko Yasunaga, Sanyoonoda (JP); Nobukatsu Shigi, Sakai (JP)

(73) Assignees: TODA KOGYO CORP., Hiroshima (JP); SAKAI CHEMICAL INDUSTRY CO., LTD., Sakai (JP)

(*) Notice: Subject to any disclaimer, the term of this patent is extended or adjusted under 35 U.S.C. 154(b) by 732 days.

(21) Appl. No.: 16/957,711

(22) PCT Filed: Dec. 17, 2018

(86) PCT No.: PCT/JP2018/046380
§ 371 (c)(1),
(2) Date: Jun. 24, 2020

(87) PCT Pub. No.: WO2019/131281
PCT Pub. Date: Jul. 4, 2019

(65) Prior Publication Data
US 2020/0361780 A1    Nov. 19, 2020

(30) Foreign Application Priority Data

Dec. 25, 2017    (JP) .................. 2017-247552

(51) Int. Cl.
*C01F 7/785*    (2022.01)
*C08L 101/00*    (2006.01)
(Continued)

(52) U.S. Cl.
CPC ............ *C01F 7/785* (2022.01); *C08L 101/00* (2013.01); *B82Y 30/00* (2013.01); *B82Y 40/00* (2013.01);
(Continued)

(58) Field of Classification Search
CPC ........ C01F 7/785; C08L 101/00; B82Y 30/00; B82Y 40/00; C01P 2002/60;
(Continued)

(56) References Cited

U.S. PATENT DOCUMENTS 3,539,306 A    11/1970    Kumura et al.
5,578,286 A    11/1996    Martin et al.
(Continued)

FOREIGN PATENT DOCUMENTS

CN    1420082 A    5/2003
CN    1168659 C    9/2004
(Continued)

OTHER PUBLICATIONS

Ogawa et al (Homogeneous Precipitation of Uniform Hydrotalcite Particles, Langmuir, 2002) (Year: 2002).*
(Continued)

*Primary Examiner* — Colin W. Slifka
*Assistant Examiner* — Logan Edward Laclair
(74) *Attorney, Agent, or Firm* — Knobbe, Martens Olson & Bear LLP (57) ABSTRACT

A method for producing hydrotalcite particles includes dissolving aluminum hydroxide in an alkaline solution to prepare an aluminate solution, causing a reaction of the aluminate solution prepared in the first step with carbon dioxide to precipitate a low-crystallinity aluminum compound, causing a first-order reaction by mixing the low-crystallinity aluminum compound with a magnesium compound to prepare a reactant containing hydrotalcite nuclear
(Continued)

particles, and causing a hydrothermal reaction of the reactant to synthesize hydrotalcite particles. The hydrotalcite particles can impart excellent heat resistance, transparency, flowability, and are useful as a resin stabilizer.

16 Claims, 3 Drawing Sheets

(51) Int. Cl.
   *B82Y 30/00* (2011.01)
   *B82Y 40/00* (2011.01)

(52) U.S. Cl.
   CPC ...... *C01P 2002/60* (2013.01); *C01P 2002/72* (2013.01); *C01P 2004/64* (2013.01); *C01P 2006/12* (2013.01)

(58) Field of Classification Search
   CPC .............. C01P 2002/72; C01P 2004/64; C01P 2006/12; C01P 2002/22; C01P 2002/74; C08K 3/26
   See application file for complete search history.

(56) References Cited

U.S. PATENT DOCUMENTS

| | | | | |
|---|---|---|---|---|
| 7,671,124 | B2 * | 3/2010 | Tsujimoto | .............. C01F 7/785 524/436 |
| 2004/0141907 | A1 | 7/2004 | Eisgruber | |
| 2011/0212014 | A1 | 9/2011 | Kwon et al. | |

FOREIGN PATENT DOCUMENTS

| | | | |
|---|---|---|---|
| CN | 102583467 | A | 7/2012 |
| CN | 103930373 | A | 7/2014 |
| CN | 105836769 | A * | 8/2016 |
| EP | 392778 | A1 | 10/1990 |
| EP | 2778137 | A1 | 9/2014 |
| JP | H03-47874 | A | 2/1991 |
| JP | S46-2280 | | 2/1992 |
| JP | H06-136179 | | 5/1994 |
| JP | 2003-048712 | | 2/2003 |
| JP | 2004-099391 | | 4/2004 |
| JP | 2004-531448 | | 10/2004 |
| JP | 2005-60164 | | 3/2005 |
| JP | S50-30039 | | 9/2012 |
| JP | 2013-103854 | | 5/2013 |
| WO | WO 2002/085787 | A1 | 10/2002 |
| WO | WO 2008/129034 | A1 | 10/2008 |
| WO | WO 2011/155787 | A2 | 12/2011 |
| WO | WO 2012/081770 | A1 | 6/2012 |
| WO | WO 2017/052333 | A1 | 3/2017 |

OTHER PUBLICATIONS

Espacenet machine translation of CN105836769A (Year: 2016).*
Office Action dated Feb. 16, 2022 received in Chinese Application No. CN 201880083257.4 in 13 pages.
Extended European Search Report dated Sep. 1, 2021 in European Patent Application No. 18895161.0.
Notice of Allowance and Search Report dated May 20, 2022 in Taiwanese Patent Application No. 107145983.
International Search Report and Written Opinion, dated Feb. 12, 2019, in International Application No. PCT/JP2018/046380.
Office Action dated Jun. 15, 2023 in corresponding Korean Patent Application No. 10-2020-7017567; 6 pages.
Yan et al., Based on the performance of hydrotalcite as anode material for a Zn—Ni secondary cell, a modification: PPY coated Zn—Al—LDH was adopted, RSC Adv., 2016, 6, 85117-85124; 8 pages.

* cited by examiner

HYDROTALCITE PARTICLES, METHOD FOR PRODUCING HYDROTALCITE PARTICLES, RESIN STABILIZER CONTAINING HYDROTALCITE PARTICLES, AND RESIN COMPOSITION CONTAINING HYDROTALCITE PARTICLES

PRIORITY AND CROSS REFERENCE TO RELATED APPLICATIONS

This application is the U.S. National Stage Application under 35 U.S.C. § 371 of International Application No. PCT/JP2018/046380, filed Dec. 17, 2018, designating the U.S. and published as WO 2019/131281 A1 on Jul. 4, 2019, which claims the benefit of Japanese Patent Application No. JP 2017-247552, filed Dec. 25, 2017. Any and all applications for which a foreign or a domestic priority is claimed is/are identified in the Application Data Sheet filed herewith and is/are hereby incorporated by reference in their entirety under 37 C.F.R. § 1.57.

TECHNICAL FIELD

The present invention relates to hydrotalcite particles, a method for producing the hydrotalcite particles, a resin stabilizer containing the hydrotalcite particles, and a resin composition containing the hydrotalcite particles.

BACKGROUND ART

Hydrotalcite is one of compounds represented by formula: $[M^{2+}_{1-x}M^{3+}_{x}(OH)_2][A^{n-}_{x/n}\cdot mH_2O]$ (in the formula, $M^{2+}$ is a divalent metal ion, $M^{3+}$ is a trivalent metal ion, $A^{n-}_{x/n}$ is an interlayer anion, $0<x<1$, n is the valence of A, and $0\leq m<1$). The hydrotalcite is widely used as, for example, an additive for catalysts, pharmaceutical products, resins, and the like.

Various types of method for efficiently producing hydrotalcite having properties according to its intended use and various types of the hydrotalcite produced by these methods have been proposed.

For example, Patent Literature 1 discloses a method in which, to an aluminum solution containing aluminums and an alkali in a specific ratio, are added a carbonic acid compound in a specific amount with respect to aluminum and a magnesium salt in a specific amount with respect to the aluminum. Then, they are reacted with each other.

Patent Literature 2 discloses a method in which a magnesium compound and/or a zinc compound and an aluminum compound are used as raw materials. In the method, is prepared slurry which contains a hydroxide and the like of the raw materials and a carboxylic group-containing compound, and which has a solid content concentration within a specific range. Wet grinding is performed on the slurry to achieve an average secondary particle size within a specific range, and a rest of the raw materials is added to the slurry. Then, hydrothermal treatment is performed.

Patent Literature 3 discloses a method in which is reacted a mixed suspension containing a trivalent metal compound and a divalent metal compound, without an alkali metal salt. The trivalent metal compound is aluminum hydroxide which has been subjected to at least wet grinding, and the divalent metal compound contains a magnesium compound.

Patent Literature 4 discloses hydrotalcites and a compounding agent for resins, which contains the hydrotalcites. The hydrotalcites have a stacked irregular index (Is) which is larger than or equal to a specific value. The stacked irregular index is defined as $Is=\tan\theta 2/\tan\theta 1$ ($\theta 1$ is an angle formed between a peak perpendicular line and a narrow angle-side peak tangent line at an X-ray diffraction peak of surface separation within a specific range, and $\theta 2$ is an angle formed between the peak perpendicular line and a wide angle-side peak tangent line at the X-ray diffraction peak).

CITATION LIST

Patent Literature

[Patent Literature 1] Japanese Laid-Open Patent Publication No. 2003-048712
[Patent Literature 2] Japanese Laid-Open Patent Publication No. 2013-103854
[Patent Literature 3] Japanese Laid-Open Patent Publication No. 2004-099391
[Patent Literature 4] Japanese Laid-Open Patent Publication No. H06-136179

SUMMARY

In the method disclosed in Patent Literature 1, a reaction is simply caused by adding the carbonic acid compound and the magnesium salt at the same time to the aluminum solution. Therefore, sufficient growth of particles of hydrotalcite is impossible. A specific surface area of the hydrotalcite having a relatively small particle size becomes large, and influence of the basicity of the hydrotalcite becomes great when the hydrotalcite is added to a resin. As a result, initial coloring of a resin composition increases. In addition, the hydrotalcite having a relatively small particle size easily results in aggregation and leads to insufficient dispersion in the resin. Therefore, such hydrotalcite having a relatively small particle size is unsuitable as, for example, an additive for resins.

In the methods disclosed in Patent Literatures 2 and 3, the aluminum compound containing aluminum hydroxide is reacted with the magnesium compound without bringing carbon dioxide into contact with the aluminum compound. Therefore, carbonate ions supposed to have an important role in synthesis of hydrotalcite are insufficient in a reaction system, and generation of a seed crystal becomes insufficient. As a result, it becomes difficult to easily produce hydrotalcite having uniform physical properties such as a particle size and/or uniform characteristics.

The hydrotalcites disclosed in Patent Literature 4 have an asymmetric specific X-ray diffraction peak and a microstructure characterized in X-ray diffraction study. The compounding agent for resins, containing the hydrotalcites, has favorable flowability for easy dry blending with a resin. However, even when the compounding agent is used, heat resistance of a resin is still insufficient and coloring of a resin is difficultly suppressed. Therefore, the compounding agent is unsuitable as, in particular, a compounding agent for a vinyl chloride resin.

As described above, there have been not found hydrotalcite which can simultaneously impart sufficiently excellent heat resistance, transparency, flowability, and the like to a resin, and a method for efficiently producing such hydrotalcite.

A method for producing hydrotalcite particles, according to the present invention, includes:
 a first step of dissolving aluminum hydroxide in an alkaline solution to prepare an aluminate solution;
 a second step of causing a reaction of the aluminate solution prepared in the first step with carbon dioxide to precipitate a low-crystallinity aluminum compound;

a third step of causing a first-order reaction by mixing the low-crystallinity aluminum compound precipitated in the second step with a magnesium compound to prepare a reactant containing hydrotalcite nuclear particles; and a fourth step of causing a hydrothermal reaction of the reactant prepared in the third step to synthesize hydrotalcite particles.

In the method, the following points (a) to (d) are preferable.

(a) A fifth step of performing a surface treatment on the hydrotalcite particles synthesized in the fourth step is further included.

(b) The low-crystallinity aluminum compound in the second step is pseudo-boehmite.

(c) The low-crystallinity aluminum compound in the second step has a crystallite size of smaller than or equal to 35 Å. The crystallite size is obtained from a diffraction peak at $2\theta/\theta=38°$ in an X-ray diffraction pattern.

(d) The low-crystallinity aluminum compound in the second step has a BET specific surface area of 100 $m^2$/g to 350 $m^2$/g.

Hydrotalcite particles according to the present invention, has a ratio of an intensity to a half value width, intensity/half value width, of higher than or equal to 4000 cps/degree. The intensity and the half value width are values of a diffraction peak of crystal plane (015) in an X-ray diffraction pattern.

It is preferred the hydrotalcite particles has a BET specific surface area of 8 $m^2$/g to 18 $m^2$/g.

A resin stabilizer according to the present invention, contains the hydrotalcite particles.

A resin composition according to the present invention, contains a resin and the hydrotalcite particles.

According to the method of the present invention, there can be efficiently produced the hydrotalcite particles which can simultaneously impart excellent heat resistance, transparency, flowability, and the like to a resin, and which are useful as, for example, a resin stabilizer.

DETAILED DESCRIPTION

<Method for Producing Hydrotalcite Particles>

A method for producing hydrotalcite particles, according to one embodiment of the present invention, will be described.

The method for producing hydrotalcite particles, according to one embodiment of the present invention, includes at least the following four steps.

First Step: A step of dissolving aluminum hydroxide in an alkaline solution to prepare an aluminate solution Second Step: A step of causing a reaction of the aluminate solution prepared in the first step with carbon dioxide to precipitate a low-crystallinity aluminum compound Third Step: A step of causing a first-order reaction by mixing the low-crystallinity aluminum compound precipitated in the second step with a magnesium compound to prepare a reactant containing hydrotalcite nuclear particles Fourth Step: A step of causing a hydrothermal reaction of the reactant prepared in the third step to synthesize hydrotalcite particles The method of the present invention can include steps other than these four steps as necessary. Other steps performed as necessary will be described later.

(First Step: Preparation of Aluminate Solution)

In the first step, an aluminate solution is prepared from aluminum hydroxide and an alkaline solution.

Examples of the aluminum hydroxide used in the first step include γ-type $Al(OH)_3$ such as gibbsite or hydrargillite, α-type $Al(OH)_3$ such as bayerite, β-type $Al(OH)_3$ such as nordstrandite, γ-type $Al(OOH)$ such as boehmite, α-type $Al(OOH)$ such as diaspore, and the like. The aluminum hydroxide used in the first step is not limited to these examples. Also the alkaline solution is not particularly limited as long as the aluminum hydroxide can be dissolvable in the alkaline solution. Examples of the alkaline solution include a sodium hydroxide solution, a potassium hydroxide solution, and the like. These solutions can be used alone, or two or more types of these solutions can be used at the same time. Among them, the sodium hydroxide solution is preferable because the sodium hydroxide solution easily dissolves the aluminum hydroxide therein and has good handling property.

It is preferred a ratio of the alkaline solution to the aluminum hydroxide, alkaline solution/aluminum hydroxide (molar ratio), for preparation of the aluminate solution is adjusted to 1.3 to 1.7, further 1.4 to 1.6. When the ratio is lower than the above-mentioned lower limit, it may become difficult to easily and sufficiently dissolve the aluminum hydroxide in the alkaline solution. When the ratio is higher than the above-mentioned upper limit, there may be insufficient the amount of a low-crystallinity aluminum compound to be precipitated in the subsequent second step.

For example, the molar ratio of the alkaline solution to the aluminum hydroxide is adjusted to fall within the above-mentioned range, and these components are heated to about 100° C. to 130° C. and are stirred for about 0.5 hour to 6 hours. As a result, there can be prepared the aluminate solution such as a sodium aluminate solution or a potassium aluminate solution. A means for stirring is not particularly limited, and, for example, a general-purpose stirrer, a general-purpose mixer, or the like can be used.

(Second Step: Precipitation of Low-Crystallinity Aluminum Compound)

In the second step, the aluminate solution prepared in the first step is reacted with carbon dioxide to precipitate a low-crystallinity aluminum compound. In the method of the present invention, precipitation of the low-crystallinity aluminum compound in the second step is one of major features and a basis of generation and optimization of a seed crystal in the subsequent third step.

Bringing carbon dioxide into contact with the aluminate solution causes a gas-liquid interfacial reaction in which the aluminate solution reacts with bubbles of the carbon dioxide thus dispersed, and the low-crystallinity aluminum compound is precipitated at bubble interface.

It is preferred conditions for bringing the carbon dioxide into contact with the aluminate solution are suitably adjusted such that the gas-liquid interfacial reaction sufficiently occurs and a desired low-crystallinity aluminum compound is precipitated. For example, it is preferred a concentration of the aluminate solution is adjusted to about 0.05 mol/L to 3 mol/L, further about 0.2 mol/L to 1.6 mol/L, a temperature of the aluminate solution is kept at about 5° C. to 70° C., further about 25° C. to 65° C., and the aluminate solution is aerated with the carbon dioxide in an aeration amount of about 0.5 L/min. to 1.0 L/min., further about 0.6 L/min. to 0.9 L/min. for an aeration time of about 50 minutes to 150 minutes, further about 50 minutes to 120 minutes, particularly about 60 minutes to 105 minutes. In particular, when the concentration and/or the temperature of the aluminate solution is out of the above-mentioned ranges respectively, and/or when the aeration amount and/or the aeration time of the carbon dioxide is out of the above-mentioned ranges respectively, coarse particles of dawsonite are generated. As a result, when eventually produced hydrotalcite particles are added to a resin, transparency of a resin composition may deteriorate. Therefore, it is preferred the concentration and the temperature of the aluminate solution, and the aeration amount and the aeration time of the carbon dioxide are adjusted to fall within the above-mentioned ranges, respectively.

A ratio of carbon dioxide, bicarbonate ion, and carbonate ion ($CO_2$, $HCO_3^-$, and $CO_3^{2-}$) in total carbonates in a reaction system varies depending on pH of the reaction system. It is preferred the pH of the reaction system composed of the aluminate solution and the carbon dioxide is 7.0 to 9.0, further 7.5 to 8.5. When the pH is within the range, it is possible to sufficiently secure bicarbonate ions ($HCO_3^-$) which will be converted into carbonate ions ($CO_3^{2-}$) in the subsequent third step, as described later.

When is evaluated properties of the low-crystallinity aluminum compound precipitated at the bubble interface through reaction of the aluminate solution with the carbon dioxide, as described above, it is preferred to subject the low-crystallinity aluminum compound to a pretreatment such as a water washing treatment or a drying treatment. For example, the drying treatment can be performed at preferably about 50° C. to 110° C., more preferably about 60° C. to 105° C. When such pretreatment is performed, it is preferred the amount of carbonate components which are attached to the precipitated low-crystallinity aluminum compound, i.e., total carbonates concentration, is 0.3% by weight (wt %) to 1.6 wt %, further 0.4 wt % to 1.5 wt %.

Note that in the present specification, the total amount of carbon dioxide, bicarbonate ion, and carbonate ion ($CO_2$, $HCO_3^-$, and $CO_3^{2-}$) in a reaction system and/or a compound, i.e., the "amount of carbonate components" is also referred to as the "total carbonates concentration".

When the low-crystallinity aluminum compound is taken out of a reaction solution and is subjected to a usual drying step, crystallinity of the compound may increase. Therefore, in order to more clearly evaluate the properties of the low-crystallinity aluminum compound, for example, a vacuum lyophilization treatment may be performed on the low-crystallinity aluminum compound. It is preferred the vacuum lyophilization treatment is performed in consideration of volatilization of the carbonate components due to drying step when the pretreatment is performed on the low-crystallinity aluminum compound. Conditions for performing the vacuum lyophilization treatment are not particularly limited. It is preferred, for example, preliminary freezing is performed at about −45° C., primary drying is performed for about 12 hours under atmospheric pressure of about 0.01 Torr to 1 Torr, heating is then performed to about 25° C., and secondary drying is performed.

Figure 1:
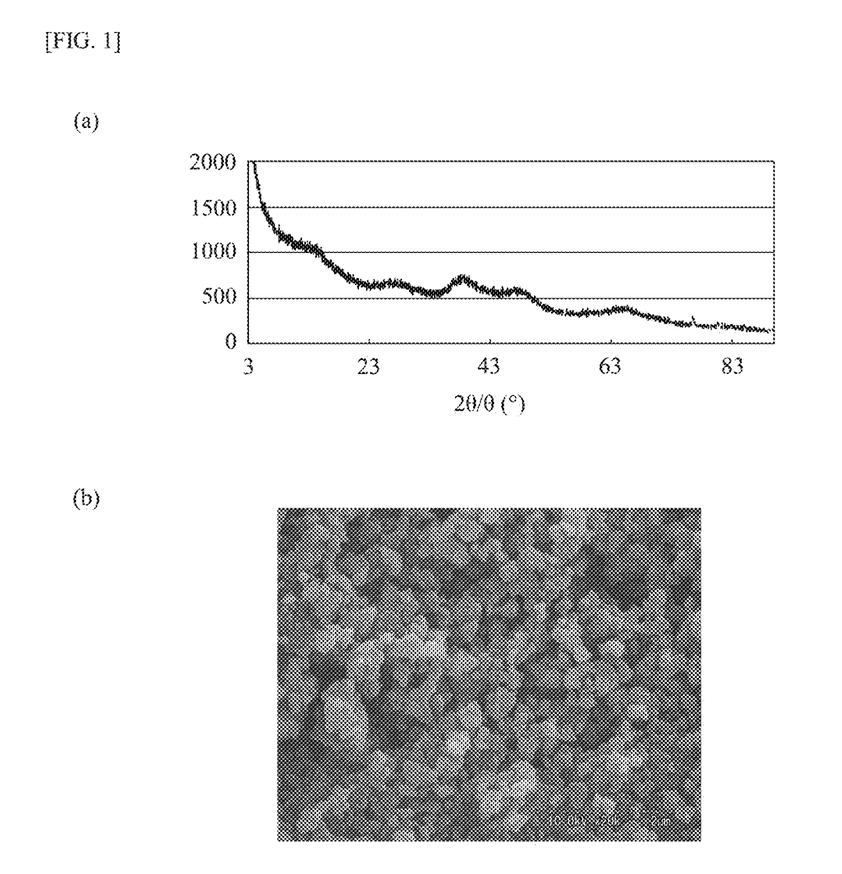
FIG. 1A is an X-ray diffraction pattern of a low-crystallinity aluminum compound after a vacuum lyophilization treatment in one embodiment of the present invention.
FIG. 1B is a scanning electron microscope photograph of the low-crystallinity aluminum compound.

As an example, the vacuum lyophilization treatment was performed on a low-crystallinity aluminum compound precipitated through reaction of an aluminate solution with carbon dioxide, and then the low-crystallinity aluminum compound was subjected to an X-ray diffraction measurement (hereinafter referred to as a XRD measurement) to give an X-ray diffraction pattern. There was also given a scanning electron microscope photograph of the low-crystallinity aluminum compound after the vacuum lyophilization treatment. The results are shown in FIGS. 1A and 1B. FIGS. 1A and 1B show the results when the aluminate solution and the carbon dioxide were reacted with each other for 70 minutes, and then the vacuum lyophilization treatment was performed. As shown in FIG. 1A, it can be seen a low-crystallinity aluminum compound is obtained. As shown in FIG. 1B, it can be seen the obtained low-crystallinity aluminum compound is composed of microscopic particles.

As described above, the low-crystallinity aluminum compound precipitated at the bubble interface has very low crystallinity and is an aluminum compound which is close to amorphous. Examples of the low-crystallinity aluminum compound include pseudo-boehmite (boehmite gel) which is almost amorphous, and the like.

The precipitated low-crystallinity aluminum compound is subjected to the XRD measurement to give an X-ray diffraction pattern, and a crystallite size of the low-crystallinity aluminum compound can be obtained from a prescribed diffraction peak in the X-ray diffraction pattern. For example, because a first-order reaction with a magnesium compound in the subsequent third step advances properly, is preferable a low-crystallinity aluminum compound of which crystallite size obtained from a diffraction peak at $2\theta/\theta=38°$ in the X-ray diffraction pattern is smaller than or equal to 35 Å, further smaller than or equal to 30 Å. Note that fine particles and retention of a predetermined shape are preferable in order to support the carbonate components used in the first-order reaction. However, because it is difficult to retain the shape when the crystallite size is too small, it is preferred the crystallite size of the low-crystallinity aluminum compound is larger than or equal to 3 Å.

Note that the crystallite size obtained from the diffraction peak at $2\theta/\theta=38°$ in the X-ray diffraction pattern is obtainable, for example, when the precipitated low-crystallinity aluminum compound is subjected to the drying treatment at about 105° C. In case the vacuum lyophilization treatment instead of the drying treatment is performed on the low-crystallinity aluminum compound, the crystallite size can be further reduced, for example, from 25 Å to 20 Å.

It is preferred the low-crystallinity aluminum compound has a BET specific surface area of 100 $m^2$/g to 350 $m^2$/g, further 120 $m^2$/g to 300 $m^2$/g. It is considered the carbonate components derived from the carbon dioxide thus used are attached to a surface of the low-crystallinity aluminum compound. When the BET specific surface area is smaller than the above-mentioned lower limit, it may become difficult for the low-crystallinity aluminum compound to retain the predetermined shape. Therefore, the amount of the carbonate components which are attached to the surface may be insufficient. When the BET specific surface area is larger than the above-mentioned upper limit, the first-order reaction with the magnesium compound in the subsequent third step may not advance properly.

Note that it is preferred the low-crystallinity aluminum compound is adjusted to be in, for example, a slurry form in consideration of reactivity with the magnesium compound and working property in the subsequent third step. A medium used to adjust the low-crystallinity aluminum compound to be in the slurry form is not particularly limited. For example, water or a liquid medium other than water, which does not adversely affects the low-crystallinity aluminum compound can be used.

(Third Step: Preparation of Reactant Containing Hydrotalcite Nuclear Particles)

In the third step, a first-order reaction is caused by mixing the low-crystallinity aluminum compound precipitated in the second step with the magnesium compound to prepare a reactant containing hydrotalcite nuclear particles. In the third step, a seed crystal is generated based on the low-crystallinity aluminum compound, and the seed crystal is optimized for synthesis of hydrotalcite particles in the subsequent fourth step.

Examples of the magnesium compound used in the third step include, for example, magnesium oxide, magnesium hydroxide, magnesium carbonate, and the like. These compounds can be used alone, or two or more types of these compounds can be used at the same time. Among them, the magnesium oxide is preferable because the magnesium oxide easily reacts with the low-crystallinity aluminum compound and has good handling property. Note that although the magnesium compound may be used in a powder form or in a form of fine particles, it is preferred the magnesium compound is adjusted to be in, for example, a slurry form in consideration of reactivity with the low-crystallinity aluminum compound and working property. A medium used to adjust the magnesium compound to be in the slurry form is not particularly limited. For example, water or a liquid medium other than water, which does not adversely affects the magnesium compound can be used.

It is preferred a ratio of the magnesium compound to the low-crystallinity aluminum compound in a first-order reaction system is adjusted such that Mg/Al (molar ratio) in desired hydrotalcite particles is 2.0 to 5.7, further 2.0 to 3.0. The ratio is adjusted such that the Mg/Al (molar ratio) falls within the above-mentioned range, and the total carbonates concentration in the first-order reaction system and/or a BET specific surface area of the reactant containing hydrotalcite nuclear particles are suitably adjusted as described later to optimize the seed crystal.

For example, the low-crystallinity aluminum compound and the magnesium compound, in which the molar ratio of Mg to Al is adjusted so as to fall within the above-mentioned range, are heated to about 20° C. to 80° C., and are mixed with each other by stirring for about 0.5 hour to 2 hours to cause the first-order reaction, and thereby, the reactant containing hydrotalcite nuclear particles can be prepared.

As described above, the ratio of carbon dioxide, bicarbonate ion, and carbonate ion ($CO_2$, $HCO_3^-$, and $CO_3^{2-}$) in total carbonates in a reaction system varies depending on pH of the reaction system. It is preferred pH of the first-order reaction system is 9.5 to 11.0, further 9.7 to 10.5. When the pH is within the range, it is possible to sufficiently secure carbonate ions ($CO_3^{2-}$) which are necessary for synthesis of hydrotalcite particles in the subsequent fourth step. It is preferred an amount of carbonate components which are attached to the hydrotalcite nuclear particles contained in the prepared reactant, i.e., total carbonates concentration, is 2.0 wt % to 4.5 wt %, further 2.3 wt % to 4.2 wt %.

It is preferred the reactant containing the hydrotalcite nuclear particles has a BET specific surface area of 80 $m^2/g$ to 150 $m^2/g$, further 90 $m^2/g$ to 130 $m^2/g$. It is considered the carbonate components are attached to surfaces of the hydrotalcite nuclear particles. When the BET specific surface area is smaller than the above-mentioned lower limit, it may become difficult to secure the carbonate components in an amount required for growth of the hydrotalcite particles. When the BET specific surface area is larger than the above-mentioned upper limit, synthesis of hydrotalcite particles through a hydrothermal reaction in the subsequent fourth step may not advance properly.

(Fourth Step: Synthesis of Hydrotalcite Particles)

In the fourth Step, the hydrothermal reaction of the reactant prepared in the third step is caused to synthesize hydrotalcite particles. The hydrothermal reaction prompts growth of particles, so that desired hydrotalcite particles are produced.

Although the hydrothermal reaction of the reactant is not particularly limited, it is preferred the hydrothermal reaction is performed in, for example, a heat-resistant container such as an autoclave. Although each of a reaction temperature and a reaction time of the hydrothermal reaction is not particularly limited, it is preferred the reaction temperature is adjusted to about 120° C. to 250° C., further about 130° C. to 240° C., and the reaction time is about 2 hours to 10 hours, further about 4 hours to 8 hours. Although a pressure in the heat-resistant container is not particularly limited, it is preferred the pressure is adjusted to about 0.1 MPa to 10 MPa, further about 0.5 MPa to 8 MPa.

In this way, the first step to the fourth step are performed in this order, and thereby, it is possible to produce desired hydrotalcite particles described later. In addition, the method of the present invention can further include the following steps.

(Fifth Step: Surface Treatment of Hydrotalcite Particles)

In the fifth step, a surface treatment is performed on the hydrotalcite particles synthesized in the fourth step. Dispersibility of the hydrotalcite particles can be more improved by performing the surface treatment.

A surface treating agent used in the surface treatment is not particularly limited. Examples of the surface treating agent are, for example, higher fatty acids including: a higher fatty acid such as stearic acid, oleic acid, erucic acid, palmitic acid, or lauric acid; a higher fatty acid metal salt (metal soap) such as lithium salt, sodium salt, or potassium salt of the higher fatty acid; and the like, anionic surfactants including: sulfuric ester salts of a higher alcohol such as stearyl alcohol or oleyl alcohol: sulfuric ester salts of polyethylene glycol ether; sulfuric ester salts having an amide linkage: sulfonates having an ether linkage; sulfonates having an ester linkage: alkyl aryl sulfonates having an amide linkage; alkyl aryl sulfonates having an ether linkage; and the like, phosphoric esters including: mono- or di-esters of orthophosphoric acid and an alcohol such as oleyl alcohol or stearyl alcohol; and mixtures of these esters, which are in an acid form, alkali metal salts, amine salts, and the like, and coupling agents including: a silane coupling agent such as vinylethoxysilane, γ-methacryloxypropyl trimethoxysilane, vinyltris(2-methoxyethoxy)silane, or γ-aminopropyl trimethoxysilane; a titanium coupling agent such as isopropyltriisostearoyl titanate, isopropyltris(dioctylpyrophosphate)titanate, or isopropyltridecyl benzenesulfonyl titanate; an aluminum coupling agent such as acetoalkoxy aluminum diisopropylate; and the like.

These surface treating agents can be used alone, or two or more types of these surface treating agents can be used at the same time. Among them, stearic acid is preferable because stearic acid exhibits significant effect for improving dispersibility of the hydrotalcite particles and has good handling property.

In order to efficiently obtain effects derived from use of the surface treating agent, it is preferred an amount of the surface treating agent is about 0.1 part by mass to 10 parts by mass, further about 0.5 part by mass to 8 parts by mass, with respect to 100 parts by mass of the hydrotalcite particles.

A method of the surface treatment is not particularly limited, and a common method such as a conventional wet method, a conventional dry method, or the like can be suitably adopted. For example, when the wet method is adopted, the surface treating agent in a liquid form or an emulsion form is added to slurry containing hydrotalcite particles and they are stirred, and they are optionally heated up to a temperature of, for example, about 100° C. so as to be sufficiently mixed with each other. Then, the hydrotalcite particles are subjected to filtration, water washing, and drying. For example, when the dry method is adopted, hydrotalcite particles are sufficiently stirred in a blender such as Henschel mixer, and in doing so, the surface treating agent in a liquid form, an emulsion form, or a solid form is added thereto and they are sufficiently mixed with each other under heating or without heating.

(Filtration Step, Water Washing Step, Drying Step, and Grinding Step)

In the method of the present invention, it is preferred a filtration step, a water washing step, a drying step, and a grinding step are performed in this order after the fourth step or the fifth step.

The hydrotalcite particles prepared through the hydrothermal reaction in the fourth step or the hydrotalcite particles subjected to the surface treatment in the fifth step are filtered to separate solid matters (cakes) containing the hydrotalcite particles from a filtrate. Then, the retrieved solid matters are subjected to water washing once or a plurality of times, and thereafter, filtered solids are retrieved. Then, the retrieved solids are dried in a dryer such as an oven, and thereafter, the solids are subjected to dry grinding.

<Hydrotalcite Particles>

For example, when the XRD measurement is performed on hydrotalcite particles which are one embodiment of the present invention and are produced through the steps described above, characteristic diffraction peaks appear in an X-ray diffraction pattern.

In case of conventional various hydrotalcites, their X-ray diffraction patterns are substantially the same as each other. However, the X-ray diffraction pattern of the hydrotalcite particles of the present invention is different from those of the conventional various hydrotalcites. Specifically, the hydrotalcite particles of the present invention are characterized by a shape of diffraction peaks at 2θ/θ=30° to 50°. In crystal planes (012), (015), and (018), the diffraction peaks are significantly different from diffraction peaks of each conventional hydrotalcite, respectively. This difference is a difference caused by crystallinity. The crystallinity in each of the crystal planes (012), (015), and (018) of the hydrotalcite particles of the present invention is higher than that of the conventional hydrotalcites. The higher crystallinity is probably based on a regular arrangement of Mg—Al. In the crystal planes (012), (015), and (018) of the conventional hydrotalcites, a long-range order exists but a short-range order is low. In contrast, in the crystal planes (012), (015), and (018) of the hydrotalcite particles of the present invention, the long-range order naturally exists and the short-range order is high. Therefore, it can be determined the hydrotalcite particles of the present invention have high crystallinity.

Note that a distance between crystal planes (003) and (006) depends on the ratio of Mg to Al, Mg/Al, in various hydrotalcites, and thus the distance hardly varies. In contrast, crystal growth is sufficiently performed in the hydrotalcite particles of the present invention. As a result, the unit number of the crystal planes (003) and (006) in one particle is larger in the hydrotalcite particles of the present invention than in the conventional hydrotalcites. Therefore, the hydrotalcite particles of the present invention can be a resin stabilizer which can impart sufficiently excellent heat resistance, transparency, and the like to, for example, a vinyl chloride resin, as described later.

The hydrotalcite particles of the present invention has a ratio of an intensity to a half value width, intensity/half value width, of higher than or equal to 4000 cps/degree, preferably higher than or equal to 5000 cps/degree. The intensity and the half value width are values of a diffraction peak of the crystal plane (015) among the crystal planes (012), (015), and (018). Therefore, the hydrotalcite particles of the present invention can simultaneously impart excellent heat resistance, transparency, flowability, and the like to a resin. Note that the crystallinity of hydrotalcite particles becomes higher as the ratio of the intensity to the half value width increases, and for example, when hydrotalcite particles having higher crystallinity are added to a resin, transparency of a resin composition is improved. However, when the ratio of the intensity to the half value width is too high, the hydrotalcite particles are overgrown, and reactivity of the hydrotalcite particles may be degraded. Therefore, it is preferred the ratio of the intensity to the half value width is lower than or equal to 15000 cps/degree.

It is preferred the hydrotalcite particles of the present invention has a BET specific surface area of 8 m²/g to 18 m²/g, further 10 m²/g to 15 m²/g. The BET specific surface area is an index of reactivity of the hydrotalcite particles. When the BET specific surface area is too small, the reactivity is lowered. When the BET specific surface area is too large, the reactivity (basicity) becomes too high and a resin to which the hydrotalcite particles having too high reactivity are added deteriorates. A large BET specific surface area means that a particle size is small. Hydrotalcite particles having a too small particle size show high aggregability, and lead to insufficient dispersion in the resin. Therefore, it is preferred the BET specific surface area of the hydrotalcite particles is within the above-mentioned range.

Specific examples of the hydrotalcite particles of the present invention preferably include hydrotalcite particles represented by the following formula (1):

$$(Mg^{2+})_{1-p}(Al^{3+})_p(OH)_2(CO_3^{2-})_{p/2} \cdot qH_2O \qquad (1)$$

(in the formula, p is preferably 0.15≤p≤0.33, more preferably 0.20≤p≤0.33, and q is preferably 0≤q<1).

<Resin Stabilizer>

A resin stabilizer of the present invention contains the hydrotalcite particles. The resin stabilizer may consist of the hydrotalcite particles or may contain a compound commonly used as a thermal stabilizer for resins together with the hydrotalcite particles.

The compound commonly used as the thermal stabilizer for resins is not particularly limited. Examples of the compound includes: a metal soap such as a stearic acid-based metal soap, a hydroxystearic acid-based metal soap, a lauric acid-based metal soap, a butyl benzoic acid-based metal soap, or a phosphoric ester-based metal soap; an inorganic lead compound such as tribasic lead sulfate, dibasic lead sulfite, dibasic lead phosphite, or dibasic lead stearate; an organic tin compound such as a dimethyltinmercapto-based compound, a dioctyltinmercapto-based compound, or a dioctyltinlaurate-based compound, and the like. These compounds can be used alone, or two or more types of these compounds can be used at the same time.

When the compound commonly used as the thermal stabilizer for resins is blended together with the hydrotalcite particles, it is preferred a ratio of the hydrotalcite particles to the compound is suitably adjusted according to purposes.

A resin to which the resin stabilizer of the present invention is applied is not particularly limited. Examples of the resin include a common thermoplastic resin and a common thermosetting resin.

Examples of the thermoplastic resin include: an olefin resin including a C2 to C8-olefin (α-olefin) polymer or copolymer such as polyethylene, chlorinated polyethylene, polypropylene, chlorinated polypropylene, ethylene-propylene copolymer, polybutene, or poly(4-methylpentene-1), and a copolymer of such C2 to C8-olefin and a diene compound; a styrene resin such as polystyrene, ABS resin, AAS resin, AS resin, or MBS resin; a vinyl chloride resin such as ethylene-vinyl chloride copolymer, ethylene-vinyl chloride-vinyl acetate graft copolymer, vinylidene chloride, polyvinylchloride, or vinyl chloride-propylene copolymer; and the like. The resin stabilizer of the present invention is useful, in particular, as a stabilizer for the vinyl chloride resin and can impart excellent heat resistance and transparency to the vinyl chloride resin.

Examples of the thermosetting resin include an epoxy resin, a phenol resin, a melamine resin, an unsaturated polyester resin, an alkyd resin, a urea resin, and the like.

When the resin stabilizer of the present invention is blended with a resin, it is preferred an amount of the resin stabilizer is suitably adjusted according to a type or the like of the resin. It is preferred the amount is, for example, about 0.01 part by mass to 50 parts by mass, further about 0.1 part by mass to 40 parts by mass, with respect to 100 parts by mass of the resin.

<Resin Composition>

A resin composition of the present invention contains at least a resin and the hydrotalcite particles.

The resin is not particularly limited. Examples of the resin include a common thermoplastic resin and a common thermosetting resin which are exemplified as resins applicable to the resin stabilizer.

An amount of the hydrotalcite particles in the resin composition is not particularly limited as long as effects for improving heat resistance, transparency, flowability, and the like by blending the hydrotalcite particles are sufficiently exhibited. It is preferred the amount is, for example, about 0.01 part by mass to 50 parts by mass, further about 0.1 part by mass to 40 parts by mass, with respect to 100 parts by mass of the resin.

A method for preparing the resin composition is not particularly limited. Hydrotalcite particles and optionally other additives are uniformly blended with a resin by a common method. Examples of the method include: a method in which the hydrotalcite particles are blended with the resin by using a known mixing means such as a ribbon blender, a high-speed mixer, or a kneader: a method in which a suspension of the hydrotalcite particles is added to slurry after polymerization, they are stirred and mixed with each other to give a mixture, and the mixture is dried; and the like.

Examples of the additive which may be optionally contained in the resin composition of the present invention include an antioxidant, a ultraviolet inhibitor, an antistatic agent, a pigment, a foaming agent, a plasticizer, a filler, a reinforcing agent, a flame retardant, a crosslinking agent, a light stabilizer, a ultraviolet absorber, a lubricant, a thermal stabilizer other than the hydrotalcite particles, water, and the like.

The resin composition of the present invention, containing the hydrotalcite particles, is excellent in, in particular, heat resistance, transparency, flowability, and the like.

EXAMPLES

With reference to examples and comparative examples, there will be described further in detail below the hydrotalcite particles, the method for producing the hydrotalcite particles, the resin stabilizer containing the hydrotalcite particles, and the resin composition containing the hydrotalcite particles, according to the present invention. However, the present invention is not limited to these examples.

Example 1: Synthesis of Hydrotalcite Particles

In a 2 L stainless steel container, 730 g of aluminum hydroxide powder (commercially available from KANTO CHEMICAL CO., INC., Cica special grade) were added into 1110 mL of 48% sodium hydroxide solution (commercially available from KANTO CHEMICAL CO., INC., Cica special grade), and they were stirred at 124° C. for 1 hour to give a sodium aluminate solution (First Step).

After the sodium aluminate solution was cooled to 80° C., ion exchange water was added into the sodium aluminate solution to achieve a total amount of 1500 mL.

After 96 mL of the sodium aluminate solution were separated into a 1 L stainless steel container, pure water was added into the solution to achieve a total amount of 730 mL (concentration of the sodium aluminate solution: 0.8 mol/L). The solution was stirred with keeping a temperature thereof at 25° C., and the solution was aerated with carbon dioxide in an aeration amount of 0.7 L/min. for 60 minutes to give adjusted aluminum hydroxide slurry (low-crystallinity aluminum compound=pseudo-boehmite) (Second Step).

Separately, 49.5 g of magnesium oxide powder (commercially available from KANTO CHEMICAL CO., INC., special grade) were added to 327 mL of pure water, and they were stirred for 1 hour to give magnesium oxide slurry.

In a 1.5 L stainless steel container, the magnesium oxide slurry and the adjusted aluminum hydroxide slurry were added into 257 mL of pure water, and they were stirred at 55° C. for 90 minutes to cause a first-order reaction. As a result, a reactant containing hydrotalcite nuclear particles was prepared (Third Step).

Then, pure water was added to the reactant to give a solution in a total amount of 1 L. The solution was put into a 2 L autoclave, and a hydrothermal synthesis was performed at 160° C. for 7 hours. As a result, hydrotalcite particles slurry was synthesized (Fourth Step).

To the hydrotalcite particles slurry were added 4.3 g of stearic acid (3 parts by mass with respect to 100 parts by mass of hydrotalcite particles) with keeping a temperature of the hydrotalcite particles slurry at 95° C. to perform a surface treatment on particles (Fifth Step). After the hydrotalcite particles slurry of which particles were surface treated was filtered and washed, a drying treatment was performed at 100° C. to give solid products of hydrotalcite particles. The produced hydrotalcite particles were subjected to an elemental analysis, resulting in that Mg/Al (molar ratio)= 2.1.

Example 2: Synthesis of Hydrotalcite Particles

In a 2 L stainless steel container, 730 g of aluminum hydroxide powder (commercially available from KANTO CHEMICAL CO., INC., Cica special grade) were added into 1110 mL of 48% sodium hydroxide solution (commercially available from KANTO CHEMICAL CO., INC., Cica special grade), and they were stirred at 124° C. for 1 hour to give a sodium aluminate solution (First Step).

After the sodium aluminate solution was cooled to 80° C., ion exchange water was added into the sodium aluminate solution to achieve a total amount of 1500 mL.

After 96 mL of the sodium aluminate solution were separated into a 1 L stainless steel container, pure water was added into the solution to achieve a total amount of 730 mL (concentration of the sodium aluminate solution: 0.8 mol/L). The solution was stirred with keeping a temperature thereof at 30° C., and the solution was aerated with carbon dioxide in an aeration amount of 0.7 L/min. for 90 minutes to give adjusted aluminum hydroxide slurry (low-crystallinity aluminum compound=pseudo-boehmite) (Second Step).

Separately, 49.5 g of magnesium oxide powder (commercially available from KANTO CHEMICAL CO., INC., special grade) were added to 327 mL of pure water, and they were stirred for 1 hour to give magnesium oxide slurry.

In a 1.5 L stainless steel container, the magnesium oxide slurry and the adjusted aluminum hydroxide slurry were added into 257 mL of pure water, and they were stirred at 55° C. for 90 minutes to cause a first-order reaction. As a result, a reactant containing hydrotalcite nuclear particles was prepared (Third Step).

Then, pure water was added to the reactant to give a solution in a total amount of 1 L. The solution was put into a 2 L autoclave, and a hydrothermal synthesis was performed at 160° C. for 7 hours. As a result, hydrotalcite particles slurry was synthesized (Fourth Step).

To the hydrotalcite particles slurry were added 4.3 g of stearic acid (3 parts by mass with respect to 100 parts by mass of hydrotalcite particles) with keeping a temperature of the hydrotalcite particles slurry at 95° C. to perform a surface treatment on particles (Fifth Step). After the hydrotalcite particles slurry of which particles were surface treated was filtered and washed, a drying treatment was performed at 100° C. to give solid products of hydrotalcite particles.

Example 3: Synthesis of Hydrotalcite Particles

In a 2 L stainless steel container, 730 g of aluminum hydroxide powder (commercially available from KANTO CHEMICAL CO., INC., Cica special grade) were added into 1110 mL of 48% sodium hydroxide solution (commercially available from KANTO CHEMICAL CO., INC., Cica special grade), and they were stirred at 124° C. for 1 hour to give a sodium aluminate solution (First Step).

After the sodium aluminate solution was cooled to 80° C., ion exchange water was added into the sodium aluminate solution to achieve a total amount of 1500 mL.

After 96 mL of the sodium aluminate solution were separated into a 1 L stainless steel container, pure water was added into the solution to achieve a total amount of 730 mL (concentration of the sodium aluminate solution: 0.8 mol/L). The solution was stirred with keeping a temperature thereof at 60° C., and the solution was aerated with carbon dioxide in an aeration amount of 0.7 L/min. for 60 minutes to give adjusted aluminum hydroxide slurry (low-crystallinity aluminum compound=pseudo-boehmite) (Second Step).

Separately, 49.5 g of magnesium oxide powder (commercially available from KANTO CHEMICAL CO., INC., special grade) were added to 327 mL of pure water, and they were stirred for 1 hour to give magnesium oxide slurry.

In a 1.5 L stainless steel container, the magnesium oxide slurry and the adjusted aluminum hydroxide slurry were added into 257 mL of pure water, and they were stirred at 55° C. for 90 minutes to cause a first-order reaction. As a result, a reactant containing hydrotalcite nuclear particles was prepared (Third Step).

Then, pure water was added to the reactant to give a solution in a total amount of 1 L. The solution was put into a 2 L autoclave, and a hydrothermal synthesis was performed at 160° C. for 7 hours. As a result, hydrotalcite particles slurry was synthesized (Fourth Step).

To the hydrotalcite particles slurry were added 4.3 g of stearic acid (3 parts by mass with respect to 100 parts by mass of hydrotalcite particles) with keeping a temperature of the hydrotalcite particles slurry at 95° C. to perform a surface treatment on particles (Fifth Step). After the hydrotalcite particles slurry of which particles were surface treated was filtered and washed, a drying treatment was performed at 100° C. to give solid products of hydrotalcite particles.

Example 4: Synthesis of Hydrotalcite Particles

In a 2 L stainless steel container, 730 g of aluminum hydroxide powder (commercially available from KANTO CHEMICAL CO., INC., Cica special grade) were added into 1110 mL of 48% sodium hydroxide solution (commercially available from KANTO CHEMICAL CO., INC., Cica special grade), and they were stirred at 124° C. for 1 hour to give a sodium aluminate solution (First Step).

After the sodium aluminate solution was cooled to 80° C., ion exchange water was added into the sodium aluminate solution to achieve a total amount of 1500 mL.

After 96 mL of the sodium aluminate solution were separated into a 1 L stainless steel container, pure water was added into the solution to achieve a total amount of 730 mL (concentration of the sodium aluminate solution: 0.8 mol/L). The solution was stirred with keeping a temperature thereof at 60° C., and the solution was aerated with carbon dioxide in an aeration amount of 0.7 L/min. for 150 minutes to give adjusted aluminum hydroxide slurry (low-crystallinity aluminum compound=pseudo-boehmite) (Second Step).

Separately, 49.5 g of magnesium oxide powder (commercially available from KANTO CHEMICAL CO., INC., special grade) were added to 327 mL of pure water, and they were stirred for 1 hour to give magnesium oxide slurry.

In a 1.5 L stainless steel container, the magnesium oxide slurry and the adjusted aluminum hydroxide slurry were added into 257 mL of pure water, and they were stirred at 55° C. for 90 minutes to cause a first-order reaction. As a result, a reactant containing hydrotalcite nuclear particles was prepared (Third Step).

Then, pure water was added to the reactant to give a solution in a total amount of 1 L. The solution was put into a 2 L autoclave, and a hydrothermal synthesis was performed at 160° C. for 7 hours. As a result, hydrotalcite particles slurry was synthesized (Fourth Step).

To the hydrotalcite particles slurry were added 4.3 g of stearic acid (3 parts by mass with respect to 100 parts by mass of hydrotalcite particles) with keeping a temperature of the hydrotalcite particles slurry at 95° C. to perform a surface treatment on particles (Fifth Step). After the hydrotalcite particles slurry of which particles were surface treated was filtered and washed, a drying treatment was performed at 100° C. to give solid products of hydrotalcite particles.

Example 5: Synthesis of Hydrotalcite Particles

In a 2 L stainless steel container, 730 g of aluminum hydroxide powder (commercially available from KANTO CHEMICAL CO., INC., Cica special grade) were added into 1110 mL of 48% sodium hydroxide solution (commercially available from KANTO CHEMICAL CO., INC., Cica special grade), and they were stirred at 124° C. for 1 hour to give a sodium aluminate solution (First Step).

After the sodium aluminate solution was cooled to 80° C., ion exchange water was added into the sodium aluminate solution to achieve a total amount of 1500 mL.

After 192 mL of the sodium aluminate solution were separated into a 1 L stainless steel container, pure water was added into the solution to achieve a total amount of 730 mL (concentration of the sodium aluminate solution: 1.6 mol/L). The solution was stirred with keeping a temperature thereof at 30° C., and the solution was aerated with carbon dioxide in an aeration amount of 0.7 L/min. for 90 minutes to give adjusted aluminum hydroxide slurry (low-crystallinity aluminum compound=pseudo-boehmite) (Second Step).

Separately, 49.5 g of magnesium oxide powder (commercially available from KANTO CHEMICAL CO., INC., special grade) were added to 327 mL of pure water, and they were stirred for 1 hour to give magnesium oxide slurry.

In a 1.5 L stainless steel container, the magnesium oxide slurry and the adjusted aluminum hydroxide slurry were added into 257 mL of pure water, and they were stirred at 55° C. for 90 minutes to cause a first-order reaction. As a result, a reactant containing hydrotalcite nuclear particles was prepared (Third Step).

Then, pure water was added to the reactant to give a solution in a total amount of 1 L. The solution was put into a 2 L autoclave, and a hydrothermal synthesis was performed at 160° C. for 7 hours. As a result, hydrotalcite particles slurry was synthesized (Fourth Step).

To the hydrotalcite particles slurry were added 4.3 g of stearic acid (3 parts by mass with respect to 100 parts by mass of hydrotalcite particles) with keeping a temperature of the hydrotalcite particles slurry at 95° C. to perform a surface treatment on particles (Fifth Step). After the hydrotalcite particles slurry of which particles were surface treated was filtered and washed, a drying treatment was performed at 100° C. to give solid products of hydrotalcite particles.

Example 6: Synthesis of Hydrotalcite Particles

In a 2 L stainless steel container, 730 g of aluminum hydroxide powder (commercially available from KANTO CHEMICAL CO., INC., Cica special grade) were added into 1110 mL of 48% sodium hydroxide solution (commercially available from KANTO CHEMICAL CO., INC., Cica special grade), and they were stirred at 124° C. for 1 hour to give a sodium aluminate solution (First Step).

After the sodium aluminate solution was cooled to 80° C., ion exchange water was added into the sodium aluminate solution to achieve a total amount of 1500 mL.

After 96 mL of the sodium aluminate solution were separated into a 1 L stainless steel container, pure water was added into the solution to achieve a total amount of 730 mL (concentration of the sodium aluminate solution: 0.8 mol/L). The solution was stirred with keeping a temperature thereof at 30° C., and the solution was aerated with carbon dioxide in an aeration amount of 1.0 L/min. for 90 minutes to give adjusted aluminum hydroxide slurry (low-crystallinity aluminum compound=pseudo-boehmite) (Second Step).

Separately, 49.5 g of magnesium oxide powder (commercially available from KANTO CHEMICAL CO., INC., special grade) were added to 327 mL of pure water, and they were stirred for 1 hour to give magnesium oxide slurry.

In a 1.5 L stainless steel container, the magnesium oxide slurry and the adjusted aluminum hydroxide slurry were added into 257 mL of pure water, and they were stirred at 55° C. for 90 minutes to cause a first-order reaction. As a result, a reactant containing hydrotalcite nuclear particles was prepared (Third Step).

Then, pure water was added to the reactant to give a solution in a total amount of 1 L. The solution was put into a 2 L autoclave, and a hydrothermal synthesis was performed at 160° C. for 7 hours. As a result, hydrotalcite particles slurry was synthesized (Fourth Step).

To the hydrotalcite particles slurry were added 4.3 g of stearic acid (3 parts by mass with respect to 100 parts by mass of hydrotalcite particles) with keeping a temperature of the hydrotalcite particles slurry at 95° C. to perform a surface treatment on particles (Fifth Step). After the hydrotalcite particles slurry of which particles were surface treated was filtered and washed, a drying treatment was performed at 100° C. to give solid products of hydrotalcite particles.

Comparative Example 1: Synthesis of Hydrotalcite Particles

In accordance with a method of Example 1 described in Japanese Laid-Open Patent Publication No. 2003-048712, hydrotalcite particles were synthesized.

In 150 g/L of NaOH solution in an amount of 3 L were dissolved 90 g of metal aluminum to give a solution. After 399 g of MgO were added to the solution, 174 g of $Na_2CO_3$ were added thereto and they were reacted with each other for 6 hours with stirring at 95° C. As a result, hydrotalcite particles slurry was synthesized.

To the hydrotalcite particles slurry were added 30 g of stearic acid (3 parts by mass with respect to 100 parts by mass of hydrotalcite particles) with keeping a temperature of the hydrotalcite particles slurry at 95° C. to perform a surface treatment on particles. After the hydrotalcite particles slurry of which particles were surface treated was cooled, filtered and washed to give solid matters, a drying treatment was performed on the solid matters at 100° C. to give solid products of hydrotalcite particles.

Comparative Example 2: Synthesis of Hydrotalcite Particles

Solid products of hydrotalcite particles were produced in a same manner as in Comparative Example 1 except that reaction conditions of 95° C. and 6 hours for synthesis of the hydrotalcite particles slurry in Comparative Example 1 were changed to hydrothermal reaction conditions of 170° C. and 6 hours.

Comparative Example 3: Synthesis of Hydrotalcite Particles

In accordance with a method of Example 1 described in Japanese Laid-Open Patent Publication No. 2013-103854, hydrotalcite particles were synthesized.

Into a 5 L container were added 447.3 g of magnesium hydroxide (d50=4.0 μm) and 299.2 g of aluminum hydroxide (d50=8.0 μm), and water was added thereto to achieve a total amount of 3 L. They were stirred for 10 minutes to prepare slurry. The slurry had physical properties of d50=10 μm and d90=75 μm. Then, the slurry was subjected to wet grinding for 18 minutes (residence time) by using Dinomill MULTILAB (wet grinding apparatus) with controlling a slurry temperature during grinding by using a cooling unit so as not to exceed 40° C. As a result, ground slurry had physical properties of d50=1.0 μm, d90=3.5 μm, and slurry viscosity=5000 cP. Then, sodium hydrogen carbonate was added to 2 L of the ground slurry such that an amount of the sodium hydrogen carbonate was ½ mole with respect to 1 mole of the magnesium hydroxide. Water was added thereto to achieve a total amount of 8 L, and they were stirred for 10 minutes to give slurry. Into an autoclave was put 3 L of the slurry, and a hydrothermal reaction was caused at 170° C. for 2 hours. As a result, hydrotalcite particles slurry was synthesized.

To the hydrotalcite particles slurry were added 6.8 g of stearic acid (3 parts by mass with respect to 100 parts by mass of hydrotalcite particles) with keeping a temperature of the hydrotalcite particles slurry at 95° C. to perform a surface treatment on particles. After solids were filtered by filtration, the filtrated cake was washed with 9 L of ion exchange water at 35° C. The filtrated cake was further washed with 100 mL of ion exchange water, and a conductance of water used for washing was measured. As a result, the conductance of this water was 50 μS/sm (25° C.). The water-washed cake was dried at 100° C. for 24 hours and was ground to give solid products of hydrotalcite particles.

Comparative Example 4: Synthesis of Hydrotalcite Particles

In accordance with a method of Example 4 described in Japanese Laid-Open Patent Publication No. 2004-099391, hydrotalcite particles were synthesized.

In a 1.5 L pot mill, were wet ground 0.425 mol of magnesium hydroxide (commercially available from Konoshima Chemical Co., Ltd., #200), 0.2 mol of aluminum hydroxide (gibbsite, commercially available from SHOWA DENKO K.K., H-42M), and 400 mL of ion exchange water, together with 600 mL of alumina balls having a size of 5 mm. As a result, a mixed suspension was prepared, and an average particle size was adjusted to 0.4 μm. To a 2000 mL stainless steel beaker (reaction container) was transferred the mixed suspension together with ball washing water to achieve a total amount of about 1000 mL. An upper part of the reaction container was covered with wrap, and the mixed suspension was heated to 95° C. with stirring. Then, carbon dioxide was supplied to an upper space in the reaction container in a supply amount of 0.01 mol/hour. After 16 hours, when pH of a reaction system decreased to 9.6 and was substantially stabilized, the reaction ended. The suspension was put into an autoclave and subjected to a hydrothermal treatment at 170° C. for 6 hours. As a result, hydrotalcite particles slurry was synthesized.

To the hydrotalcite particles slurry were added 1.4 g of stearic acid (3 parts by mass with respect to 100 parts by mass of hydrotalcite particles) with keeping a temperature of the hydrotalcite particles slurry at 95° C. to perform a surface treatment on particles. The hydrotalcite particles slurry of which particles were surface treated was subjected to filtration, water washing, and evaporation to dryness, and was ground by a sample mill to give solid products of hydrotalcite particles.

Comparative Example 5: Synthesis of Hydrotalcite Particles

In accordance with a method of Example 1 described in Japanese Laid-Open Patent Publication No. H06-136179, hydrotalcite particles were synthesized.

To 1 L of water were added 39.17 g of sodium hydroxide and 11.16 g of sodium carbonate with stirring, and they were heated to 40° C. Then, to 500 mL of distilled water were added 61.28 g of magnesium chloride (19.7% as MgO), 37.33 g of aluminum chloride (20.5% as $Al_2O_3$), and 2.84 g of ammonium chloride (31.5% as $NH_3$) such that a molar ratio of Mg to Al, Mg/Al, was 2.0 and a molar ratio of $NH_3$ to Al, $NH_3$/Al, was 0.35. As a result, an aqueous solution A was prepared. The aqueous solution A was gradually poured into a reaction system of the sodium hydroxide and the sodium carbonate. The reaction system after pouring had pH of 10.2. Moreover, a reaction of the reaction system was caused at 90° C. for about 20 hours with stirring to give hydrotalcite particles slurry.

To the hydrotalcite particles slurry were added 1.1 g of stearic acid, and a surface treatment was performed on particles with stirring to give a reacted suspension. The reacted suspension was subjected to filtration and water washing, and then the reacted suspension was subjected to drying at 70° C. The dried suspension was ground by a compact sample mill to give solid products of hydrotalcite particles.

Test Example: Evaluation of Hydrotalcite Particles

The hydrotalcite particles produced in Examples 1 to 6 and Comparative Examples 1 to 5 were evaluated in accordance with the following methods. The results are shown in Table 1. Note that Table 1 also shows: the concentration and the temperature of the aluminate solution, the aeration amount and the aeration time of carbon dioxide, and the pH of the reaction system in the second step; and the pH of the first-order reaction system in the third step.

(I) Measurement of Physical Property

[XRD Measurement]

By using an X-ray diffractometer (commercially available from Rigaku Corporation, MiniFlex600), measurement was performed under conditions including a voltage of 40 KV, a current of 15 mA, and a measurement range of 2θ/θ=3° to 90° to give an X-ray diffraction pattern.

(1) Crystallite Size of Low-Crystallinity Aluminum Compound

A crystallite size was obtained by using a diffraction peak at 2θ/θ=38° in the X-ray diffraction pattern.

(2) Ratio of Intensity to Half Value Width of Diffraction Peak of Crystal Plane (015) of Hydrotalcite Particles A ratio "(015)Ratio" of a relative intensity "D(015)" of a diffraction peak of crystal plane (015) in the X-ray diffraction pattern to a full width at half maximum (FWHM) "FWHM(015)" of the diffraction peak was obtained in accordance with the following equation.

$$(015)Ratio=D(015)/FWHM(015)$$

[BET Specific Surface Area]

Measurement was performed conforming to a method defined in JIS Z 8830.

[Elemental Analysis]

A molar ratio of Mg to Al, Mg/Al, was measured by using an ICP emission analyzer (commercially available from PerkinElmer, Inc., Optima-8300). As a pretreatment, the hydrotalcite particles were weighed and mixed with hydrochloric acid, and then, the hydrotalcite particles were dissolved in the hydrochloric acid by heating to give a sample solution. Then, the sample solution was diluted with ion exchange water to achieve a prescribed concentration. A measured value was obtained in accordance with a calibration curve method.

[Total Carbonates Concentration]

A carbon/sulfur analyzer (commercially available from HORIBA, Ltd., EMIA-920V) was used. The hydrotalcite particles were weighed in a crucible. After tungsten powder (commercially available from HORIBA, Ltd.) and iron powder (commercially available from KISHIDA CHEMICAL Co., Ltd.), as a firework fuel, were mixed therewith, they were subjected to complete combustion in a high-frequency induction superheating furnace. Moisture was removed from gas thus generated, and the gas was introduced into an infrared gas analyzer to obtain a measured value. The measured value was treated as the total carbonates concentration.

(II) Evaluation of Property

To 100 parts by mass of polyvinylchloride (polymerization degree: 1000) were added 50 parts by mass of dioctyl phthalate, 0.5 part by mass of zinc stearate, and 2 parts by mass of the hydrotalcite particles. They were uniformly mixed with each other to give a resin composition.

The resin composition was kneaded for 5 minutes by using a roll having a temperature of 160° C. and was molded to give a sheet. Heat resistance for oven, heat resistance for press, and transparency of the sheet were evaluated in accordance with the following methods, respectively.

[Heat Resistance for Oven by Geer-Type Oven Test]

In a Geer-type oven, the sheet was exposed in an atmosphere of 180° C. for 60 minutes. Discoloration of the exposed sheet was visually observed and evaluated based on the following evaluation criteria.

(Evaluation Criteria)
⊚: No discoloration was observed.
○: Slight discoloration was observed.
Δ: A little discoloration was observed.
x: Discoloration was observed.
x x: Significant discoloration was observed.

[Heat Resistance for Press]

The sheet was pressed for 20 minutes by using a press having a temperature of 170° C. Discoloration of the pressed sheet was visually observed and evaluated based on the following evaluation criteria.

(Evaluation Criteria)
⊚: No discoloration was observed.
○: Slight discoloration was observed.
Δ: A little discoloration was observed.
x: Discoloration was observed.
x x: Significant discoloration was observed.

[Transparency]

The sheet was pressed for 5 minutes by using a press having a temperature of 170° C. Transparency (HAZE) of the pressed sheet was measured conforming to a method defined in JIS K 7136.

Figure 2:
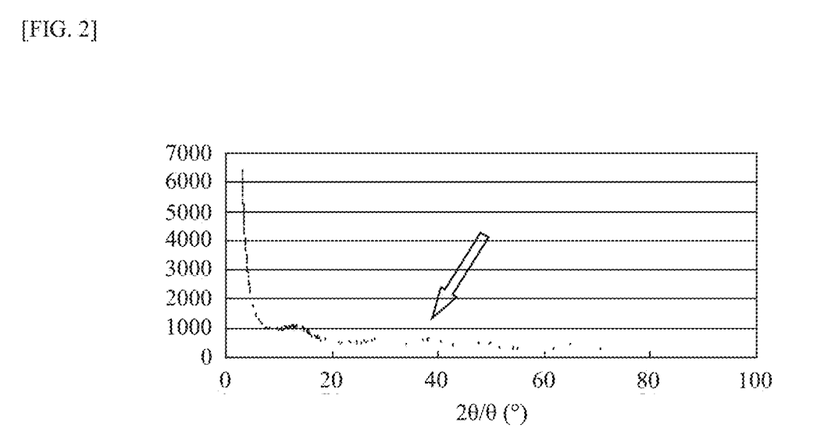
FIG. 2 is an X-ray diffraction pattern of a low-crystallinity aluminum compound after a usual drying treatment in Example 1 of the present invention.

In Example 1, after the low-crystallinity aluminum compound obtained in the second step was subjected to a common drying treatment at about 105° C., the XRD measurement was performed in accordance with the above-mentioned method described in [XRD Measurement] to give an X-ray diffraction pattern. The result is shown in FIG. 2.

Figure 3:
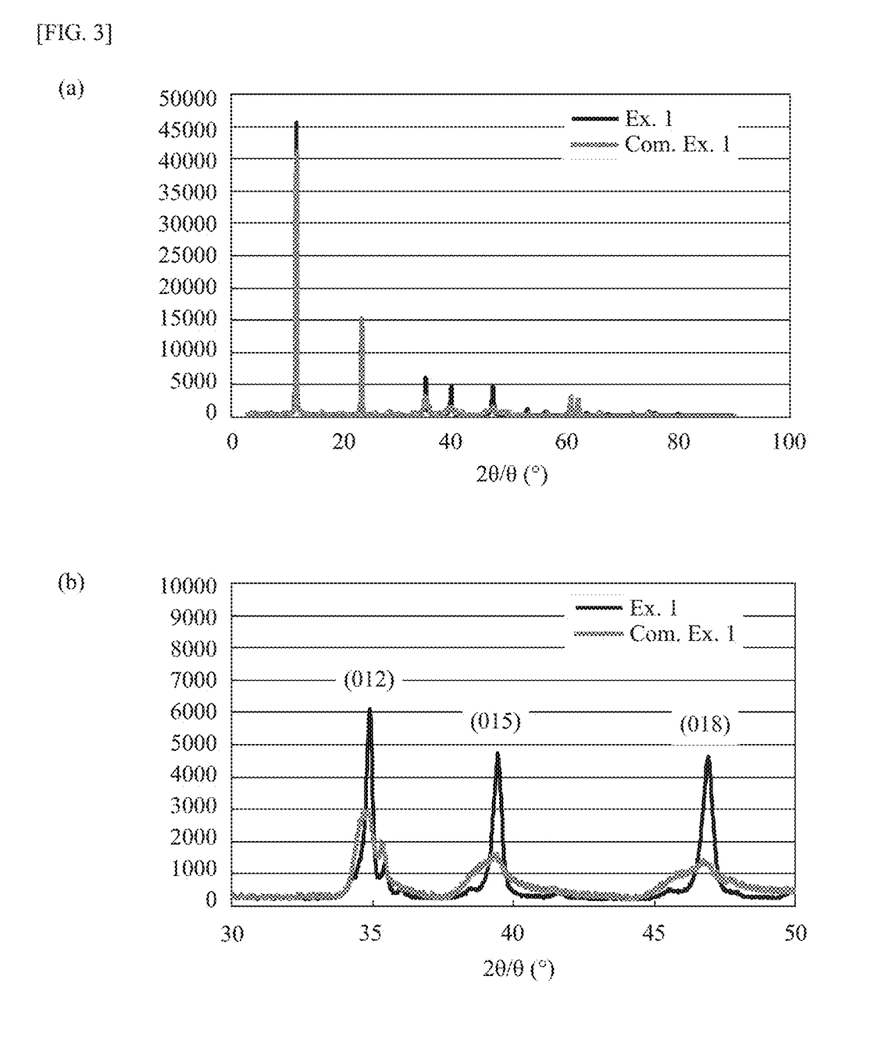
FIG. 3A is an X-ray diffraction pattern of hydrotalcite particles in Example 1 of the present invention and Comparative Example 1.
FIG. 3B is an enlarged view of a part of diffraction peaks in the X-ray diffraction pattern.

In Example 1 and Comparative Example 1, the eventually produced hydrotalcite particles were subjected to the XRD measurement in accordance with the above-mentioned method described in [XRD Measurement] to give each X-ray diffraction pattern. The results are shown in FIG. 3A. An enlarged view of diffraction peaks of the crystal planes (012), (015), and (018) in each X-ray diffraction pattern is shown in FIG. 3B.

TABLE 1

| | Second step | | | | | Low-crystallinity aluminum compound | | |
|---|---|---|---|---|---|---|---|---|
| | Reaction system | | | | | | | |
| | Aluminate solution | | Carbon dioxide | | | Total | Crystallite | BET specific |
| | Concentration (mol/L) | Temperature (° C.) | Aeration amount (L/min.) | Aeration time (min.) | pH | carbonates concentration (wt %) | size (Å) | surface area (m²/g) |
| Ex. 1 | 0.8 | 25 | 0.7 | 60 | 7.8 | 0.5 | 25 | 350 |
| Ex. 2 | 0.8 | 30 | 0.7 | 90 | 7.0 | 0.6 | 21 | 300 |
| Ex. 3 | 0.8 | 60 | 0.7 | 60 | 8.2 | 0.5 | 27 | 250 |
| Ex. 4 | 0.8 | 60 | 0.7 | 150 | 7.5 | 0.6 | 28 | 120 |
| Ex. 5 | 1.6 | 30 | 0.7 | 90 | 8.0 | 0.8 | 32 | 200 |
| Ex. 6 | 0.8 | 30 | 1.0 | 90 | 7.1 | 0.7 | 29 | 180 |
| Com. Ex. 1 | — | — | — | — | — | — | — | — |
| Com. Ex. 2 | — | — | — | — | — | — | — | — |
| Com. Ex. 3 | — | — | — | — | — | — | — | — |
| Com. Ex. 4 | — | — | — | — | — | — | — | — |
| Com. Ex. 5 | — | — | — | — | — | — | — | — |

TABLE 1-continued

| | Third step | | | Fourth step | | Property of resin composition | | |
|---|---|---|---|---|---|---|---|---|
| | pH of | Reactant containing hydrotalcite nuclear particles | | | Hydrotalcite particles | | | |
| | First-order reaction system | Total carbonates concentration (wt %) | BET specific surface area ($m^2/g$) | (015)Ratio (cps/degree) | BET specific surface area ($m^2/g$) | Heat resistance for oven | Heat resistance for press | Transparency |
| Ex. 1 | 10.1 | 3.2 | 114.1 | 12000 | 12.0 | ⊚ | ⊚ | 5.5 |
| Ex. 2 | 10.4 | 4.1 | 102.0 | 12000 | 9.0 | ⊚ | ⊚ | 5.5 |
| Ex. 3 | 9.9 | 2.6 | 91.7 | 9000 | 10.0 | ⊚ | ⊚ | 8.0 |
| Ex. 4 | 9.5 | 3.5 | 82.3 | 9000 | 11.0 | ⊚ | ⊚ | 8.5 |
| Ex. 5 | 10.0 | 2.8 | 89.5 | 7500 | 10.5 | ⊚ | ⊚ | 8.0 |
| Ex. 6 | 10.2 | 3.7 | 85.3 | 8000 | 10.5 | ⊚ | ⊚ | 8.0 |
| Com. Ex. 1 | 13.0 | — | — | 750 | 35.0 | X X | X X | 35 |
| Com. Ex 2 | 13.0 | — | — | 1200 | 20.0 | X | X X | 20 |
| Com. Ex. 3 | 9.5 | — | — | 3500 | 12.5 | ○ | ○ | 10 |
| Com. Ex. 4 | 9.6 | — | — | 2000 | 14.5 | Δ | ○ | 20 |
| Com. Ex. 5 | 10.2 | — | — | 900 | 33.5 | X X | X X | 40 |

As shown in Table 1, the hydrotalcite particles in each of Examples 1 to 6 were produced by performing the first step to the fourth step in this order in the method of the present invention. As represented by the result of Example 1 shown in FIGS. 3A and 3B, the diffraction peaks of the crystal planes (012), (015), and (018) are sharp. These hydrotalcite particles in Examples 1 to 6 each have a high (015)Ratio of higher than or equal to 4000 cps/degree. Moreover, these hydrotalcite particles each have a small BET specific surface area of 8 $m^2/g$ to 18 $m^2/g$. The resin compositions each produced by blending these hydrotalcite particles are excellent in heat resistance for oven, heat resistance for press, and transparency.

In contrast, the hydrotalcite particles in each of Comparative Examples 1 to 5 were produced by each conventional method. As represented by the result of Comparative Example 1 shown in FIGS. 3A and 3B, the diffraction peaks of the crystal planes (012), (015), and (018) are broad. These hydrotalcite particles in Comparative Examples 1 to 5 each have a low (015)Ratio of lower than 4000 cps/degree. The resin compositions each produced by blending these hydrotalcite particles are inferior in heat resistance for oven, heat resistance for press, and transparency to the resin compositions in Examples 1 to 6. Among the hydrotalcite particles in Comparative Examples 1 to 5, the hydrotalcite particles in Comparative Example 3 has a relatively high (015)Ratio. Although the resin composition produced by blending the hydrotalcite particles in Comparative Example 3 exhibits good heat resistance for oven and heat resistance for press, the resin composition exhibits insufficient transparency.

Note that for the hydrotalcite particles produced in each of Examples 1 to 6 and Comparative Example 5, a stacked irregular index (Is) described in Japanese Laid-Open Patent Publication No. H06-136179 was calculated. The stacked irregular index is defined as the following equation.

$$Is = \tan\theta2/\tan\theta1$$

In the formula, θ1 is an angle formed between a peak perpendicular line and a narrow angle-side peak tangent line at an X-ray diffraction peak of surface separation within a range of 2.49 Å to 2.05 Å, and θ2 is an angle formed between the peak perpendicular line and a wide angle-side peak tangent line at the X-ray diffraction peak. As a result, the stacked irregular index (Is) of the crystal plane (015) of the hydrotalcite particles produced in Comparative Example 5 exceeded 2. In contrast, the hydrotalcite particles produced in each of Examples 1 to 6 had the stacked irregular index (Is) of less than 1.2. Thus, the diffraction peak of the hydrotalcite particles produced in Comparative Example 5 is a very asymmetric peak, while the diffraction peak of the hydrotalcite particles produced in each of Examples 1 to 6 is an almost symmetric peak. So it can been seen the hydrotalcite particles produced in each of Examples 1 to 6 are quite different from the hydrotalcite particles produced in Comparative Example 5.

The hydrotalcite particles of the present invention are useful, for example, as an additive for resins, such as a resin stabilizer.

What is claimed is:

1. Hydrotalcite particles having a ratio of an intensity to a half value width, intensity/half value width, of higher than or equal to 4000 cps/degree, the intensity and the half value width being values of a diffraction peak of crystal plane (015) in an X-ray diffraction pattern, wherein the hydrotalcite particles are produced by a method comprising:
    dissolving aluminum hydroxide in an alkaline solution to prepare an aluminate solution;
    causing a reaction of the aluminate solution with carbon dioxide to precipitate a low-crystallinity aluminum compound;
    causing a first-order reaction by mixing the low-crystallinity aluminum compound with a magnesium compound to prepare a reactant containing hydrotalcite nuclear particles; and
    causing a hydrothermal reaction of the reactant to synthesize hydrotalcite particles.

2. The hydrotalcite particles according to claim 1, having a BET specific surface area of 8 $m^2/g$ to 18 $m^2/g$.

3. A resin stabilizer comprising:
    the hydrotalcite particles according to claim 1.

4. The hydrotalicite particles according to claim 1, wherein the method by which the particles are prepared further comprises performing a surface treatment on the hydrotalcite particles.

5. The hydrotalicite particles according to claim 1, wherein the low-crystallinity aluminum compound used in the method by which the particles are prepared has a crystallite size of smaller than or equal to 35 Å, the crystallite size being obtained from a diffraction peak at 2θ/θ=38° in an X-ray diffraction pattern.

6. The hydrotalicite particles according to claim 1, wherein the low-crystallinity aluminum compound used in the method by which the particles are prepared has a BET specific surface area of 100 m$^2$/g to 350 m$^2$/g.

7. A resin composition comprising:
a resin; and
the hydrotalcite particles according to claim 1.

8. The resin composition according to claim 7, wherein the resin is a vinyl chloride resin.

9. The resin composition according to claim 8, wherein no discoloration of the resin composition is observed after exposing in an atmosphere of 180° C. for 60 minutes.

10. The resin composition according to claim 8, wherein no discoloration of the resin composition is observed after pressing for 20 minutes in a press having a temperature of 170° C.

11. The resin composition according to claim 8, wherein the resin composition has a transparency (HAZE) of 8.5 or less when measured conforming to a method defined in JIS K 7136 after being pressed for 5 minutes at a temperature of 170° C.

12. A method for producing hydrotalcite particles according to claim 1, comprising:
dissolving the aluminum hydroxide in the alkaline solution to prepare the aluminate solution;
causing the reaction of the aluminate solution with the carbon dioxide to precipitate the low-crystallinity aluminum compound;
causing the first-order reaction by mixing the low-crystallinity aluminum compound with the magnesium compound to prepare the reactant containing hydrotalcite nuclear particles; and
causing the hydrothermal reaction of the reactant to synthesize the hydrotalcite particles.

13. The method for producing hydrotalcite particles, according to claim 12, further comprising:
performing a surface treatment on the hydrotalcite particles.

14. The method for producing hydrotalcite particles, according to claim 12, wherein
the low-crystallinity aluminum compound is pseudo-boehmite.

15. The method for producing hydrotalcite particles, according to claim 12, wherein the low-crystallinity aluminum compound has a crystallite size of smaller than or equal to 35 Å, the crystallite size being obtained from a diffraction peak at $2\theta/\theta=38°$ in an X-ray diffraction pattern.

16. The method for producing hydrotalcite particles, according to claim 12, wherein the low-crystallinity aluminum compound has a BET specific surface area of 100 m$^2$/g to 350 m$^2$/g.

* * * * *